(12) United States Patent
Kodera et al.

(10) Patent No.: US 10,385,201 B2
(45) Date of Patent: *Aug. 20, 2019

(54) RESIN COMPOSITE, METHOD OF PRODUCING THE RESIN, MOLDED PRODUCT, FILM, AND ARTICLE

(71) Applicant: KURARAY CO., LTD., Kurashiki-shi (JP)

(72) Inventors: Jumpei Kodera, Tainai (JP); Kaori Maeda, Tainai (JP); Noboru Higashida, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/562,040

(22) PCT Filed: Mar. 31, 2016

(86) PCT No.: PCT/JP2016/001865
§ 371 (c)(1),
(2) Date: Sep. 27, 2017

(87) PCT Pub. No.: WO2016/157908
PCT Pub. Date: Oct. 6, 2016

(65) Prior Publication Data
US 2018/0100063 A1 Apr. 12, 2018

(30) Foreign Application Priority Data

Apr. 3, 2015 (JP) .................. 2015-076714

(51) Int. Cl.
| | | |
|---|---|---|
| *C08F 220/14* | (2006.01) | |
| *C08L 33/12* | (2006.01) | |
| *C23C 28/02* | (2006.01) | |
| *F21V 8/00* | (2006.01) | |
| *G02B 1/04* | (2006.01) | |
| *B32B 27/18* | (2006.01) | |
| *B32B 27/30* | (2006.01) | |
| *C08J 5/18* | (2006.01) | |
| *C08K 5/3492* | (2006.01) | |
| *C08L 33/10* | (2006.01) | |
| *C08L 53/00* | (2006.01) | |

(52) U.S. Cl.
CPC .............. *C08L 33/12* (2013.01); *B32B 27/18* (2013.01); *B32B 27/30* (2013.01); *C08F 220/14* (2013.01); *C08J 5/18* (2013.01); *C08K 5/3492* (2013.01); *C08L 33/10* (2013.01); *C08L 53/00* (2013.01); *C23C 28/02* (2013.01); *G02B 1/04* (2013.01); *G02B 6/0066* (2013.01); *C08L 2201/10* (2013.01)

(58) Field of Classification Search
CPC ....... B32B 27/18; B32B 27/30; C08F 220/06; C08F 220/14; C08F 293/00; C08F 297/026; C08F 297/02; C08L 33/06; C08L 33/10; C08L 33/12; C08L 53/00; C08L 2201/10; C08L 2203/16; C08J 5/18; C08K 5/3492; C32C 28/02; G02B 1/04; G02B 6/0066
See application file for complete search history.

(56) References Cited

U.S. PATENT DOCUMENTS

| | | |
|---|---|---|
| 2003/0191243 A1 | 10/2003 | Hamada et al. |
| 2004/0106732 A1 | 6/2004 | Tsuji et al. |
| 2004/0147674 A1 | 7/2004 | Kakeda et al. |
| 2009/0105396 A1 | 4/2009 | Fujihara et al. |
| 2011/0218303 A1 | 9/2011 | Oshima et al. |
| 2013/0217827 A1 | 8/2013 | Ozawa et al. |
| 2015/0299449 A1 | 10/2015 | Ozawa et al. |
| 2017/0158830 A1* | 6/2017 | Maeda ................. C08J 5/18 |

FOREIGN PATENT DOCUMENTS

| | | |
|---|---|---|
| EP | 2634214 | 9/2013 |
| EP | 3075780 | 10/2016 |
| JP | 56-27378 B2 | 6/1981 |
| JP | 10-168271 A | 6/1998 |
| JP | 2002-80678 A | 3/2002 |

(Continued)

OTHER PUBLICATIONS

International Search Report dated Jul. 5, 2016 in PCT/JP2016/001865 filed Mar. 31, 2016.

(Continued)

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

A resin composite that excels in weatherability and transparency and experiences less bleed out and whitening at a high temperature, and a method for producing the resin composite, and the like are provided. Specifically, the resin composite includes: a methacrylic resin (A) that contains a structural unit derived from methyl methacrylate and that has a melt viscosity $\eta(A)$ of 1,500 to 3,500 Pa·s; and a block copolymer (B) in which a methacrylic acid ester polymer block (b2) is coupled to an acrylic acid ester polymer block (b1). The block copolymer (B) has a melt viscosity $\eta(B)$ of 75 to 1,500 Pa·s. A ratio $\eta(A)/\eta(B)$ is from 1 to 20. 0.1 to 3 parts by mass of a hydroxy phenyl triazine-based UV absorber is contained in 100 parts by mass of the total of the methacrylic resin (A) and the block copolymer (B).

15 Claims, No Drawings

(56) References Cited

FOREIGN PATENT DOCUMENTS

| | | |
|---|---|---|
| JP | 2003-277574 | 10/2003 |
| JP | 2012-213911 A | 11/2012 |
| JP | 2013-23599 A | 2/2013 |
| JP | 2013-43964 A | 3/2013 |
| WO | WO02/081561 | 10/2002 |
| WO | WO02/092696 | 11/2002 |
| WO | WO2010/055798 | 5/2010 |
| WO | WO2012/057079 | 5/2012 |
| WO | WO2014/002506 | 1/2014 |
| WO | 2014/073216 A1 | 5/2014 |
| WO | WO2015/076398 | 5/2015 |
| WO | WO-2015076398 A1 * | 5/2015 |

OTHER PUBLICATIONS

Extended European Search Report dated Oct. 15, 2018 in Patent Application No. 16771794.1, 7 pages.
European Search Report dated Oct. 2, 2018 in EP Patent Application No. 16758646.0, (which is a corresponding U.S. Appl. No. 15/554,946.

* cited by examiner

RESIN COMPOSITE, METHOD OF PRODUCING THE RESIN, MOLDED PRODUCT, FILM, AND ARTICLE

TECHNICAL FIELD

The present invention relates to a resin composite that includes a methacrylic resin (A) and a block copolymer (B) and to a method of producing the resin composite. The present invention also relates to a molded product including a molding formed of the resin composite, and a film and an article that include a resin film (R) formed of the resin composite.

BACKGROUND ART

A methacrylic resin excels in such optical properties as transparency and in weatherability, and a molded product of the methacrylic resin has an aesthetic appearance. Thus, to date, such a molded product has been used in a variety of applications, including lighting equipment, indication members such as a signboard, optical members such as a display component, interior design members, construction members, electronic and electric members, and medical members. However, a methacrylic resin is a brittle material. In particular, when a methacrylic resin is used for a film, the film is brittle and sometimes experiences such problems as breakage when the film is transported, when passed through an accumulator, when taken up, when cut, when put into a secondary process such as vacuum forming, when put into a punching process, or when affixed to another base film.

Thus, in order to improve the brittleness of a methacrylic resin, a resin composite in which various types of materials are alloyed or blended with the methacrylic resin has being proposed. Patent Literature 1 proposes an acryl-based resin film in which core-shell-type particles are blended. Meanwhile, Patent Literature 2 discloses an acryl-based resin film in which a polyvinyl acetal resin is alloyed. Patent Literature 3 discloses a polymer composite that contains, at a specific ratio, a thermoplastic resin (a) and a block copolymer (b) that includes, in the molecules, at least one structure in which a highly syndiotactic polymethacrylic acid alkyl ester block is coupled to each of two ends of a polyacrylic acid alkyl ester block. Furthermore, Patent Literature 4 discloses a resin composite that includes a block copolymer having an acrylic acid ester polymer block containing a specific amount of a structural unit derived from an acrylic acid alkyl ester and a specific amount of a structure derived from a (meth)acrylic acid aromatic ester. In addition, Patent Literature 5 discloses an acryl-based resin composite obtained by blending 0.3 to 3 parts by mass of a polymer processing aid (B) with 100 parts by mass of an acryl-based block copolymer (A). Patent Literature 1 to 5 described above improves the brittleness of a methacrylic resin. However, recently, there is a demand for a resin composite that excels in transparency and experiences less whitening at a high temperature.

In addition, radicals are generated when the polymer chain of the methacrylic resin is cut by ultraviolet rays with time, then the methacrylic resin deteriorates. Therefore, in applications exposed to the ultraviolet rays, for example, the outdoor applications such as signboard parts or automobile parts, resins having less deterioration have been demanded conventionally. As a method for preventing deterioration of the resin, a method of adding an UV absorber is effective. To protect a base which is weak in ultraviolet rays located under an outermost layer, it is preferable to use a molding formed from the resin which added an ultraviolet absorbent as the outermost layer of the article.

CITATION LIST

Patent Literature

Patent Literature 1: Japanese Examined Patent Application Publication No. S56-27378
Patent Literature 2: Japanese Unexamined Patent Application Publication No. 2013-23599
Patent Literature 3: Japanese Unexamined Patent Application Publication No. H10-168271
Patent Literature 4: International Patent Publication No. WO2014/073216
Patent Literature 5: Japanese Unexamined Patent Application Publication No. 2013-43964

SUMMARY OF INVENTION

Technical Problem

However, the resin with UV absorber has a problem that, due to the UV absorber bleeding out from the molding, the weatherability of the molding deteriorates speedily. Moreover, the resin with the UV absorber has a problem that a molding machine is polluted at the time of production and molding. Furthermore, the resin with the UV absorber has a problem that the appearance of the molding deteriorates under a high temperature environment such as 100° C. or more.

So far, benzotriazole-based UV absorber has been generally used for methacryl-based resin as an ultraviolet absorbent. However, when benzotriazole-based ultraviolet absorbent is blended with a resin composite containing a particular methacrylic resin and a block copolymer, it causes a major problem in that the UV absorber bleeds out.

The present invention has been made in view of the above background and is directed to providing a resin composite that excels in weatherability and transparency and that experiences less bleed out and whitening at a high temperature, a method of producing such the resin composite, a molded product, a film, and an article.

Solution to Problem

The present inventors have conducted diligent examinations and have found that when a resin composite using the following specific methacrylic resin (A) and block copolymer (B) satisfies the following specific melt viscosity ratio $\eta(A)/\eta(B)$ and 0.1 to 3 parts by mass of a hydroxy phenyl triazine-based UV absorber is contained in the resin composite, the resin composite excels in weatherability and transparency and bleed out and whitening at a high temperature is reduced, and have completed the invention that encompasses the following aspects.

[1] A resin composite including:
a methacrylic resin (A) that contains no less than 80% by mass of a structural unit derived from methyl methacrylate and that has a melt viscosity $\eta(A)$ of 1,500 to 3,500 Pa·s at 220° C. and at a shear rate of 122/sec; and
a block copolymer (B) in which a methacrylic acid ester polymer block (b2) is coupled to an acrylic acid ester polymer block (b1), in which
the block copolymer (B) has a melt viscosity $\eta(B)$ of 75 to 1,500 Pa·s at 220° C. and at a shear rate of 122/sec, in which a ratio η(A)/η(B) of the melt viscosity η (A) to the melt viscosity η(B) is from 1 to 20, and 0.1 to 3 parts by mass of a hydroxyphenyl triazine-based UV absorber is contained in 100 parts by mass of the total of the methacrylic resin (A) and the block copolymer (B).

[2] The resin composite according to [1], in which the molecular weight of the hydroxyphenyl triazine-based UV absorber is 500 or more.

[3] The resin composite according to [1] or [2], in which 65 to 99 parts by mass of the methacrylic resin (A) and 1 to 35 parts by mass of the block copolymer (B) are contained in 100 parts by mass of the total of the methacrylic resin (A) and the block copolymer (B), and the block copolymer (B) contains 30 to 60% by mass of the acrylic acid ester polymer block (b1) and 40 to 70% by mass of the methacrylic acid ester polymer block (b2).

[4] The resin composite according to any one of [1] to [3], further including: with respect to 100 parts by mass of the resin composite, 0.3 to 3 parts by mass of a processing aid that is composed of no less than 60% by mass of a methyl methacrylate unit and no greater than 40% by mass of a vinyl-based monomer unit that can be copolymerized with methyl methacrylate, the processing aid having a mean degree of polymerization of 3,000 to 40,000.

[5] A molded product, including: a molding formed of the resin composite according to any one of [1] to [4].

[6] A film, including: at least a resin film (R) formed of the resin composite according to any one of [1] to [4].

[7] The film according to [6], in which a surface roughness of at least one surface of the resin film (R) is no greater than 1.5 nm.

[8] The film according to [6] or [7], in which a haze of the resin film (R) is no greater than 0.7%.

[9] The film described in any one of [6] to [8], in which the number of fish eyes having a size 0.03 $mm^2$ or more in the resin film (R) is 0.2/$m^2$ or less.

[10] The film according to any one of [6] to [9], in which a pencil hardness of at least one surface of the resin film (R) is no lower than HB. [11] The film according to any one of [6] to [10], in which printing is performed on at least one surface of the resin film (R).

[12] The film according to any one of [6] to [11], in which at least one of (i) a metal layer, (ii) a metal oxide layer, (iii) a thermoplastic resin layer, and (iv) a base material layer is laminated on at least one surface of the resin film (R).

[13] An article, including:
the film according to any one of [6] to [12] provided on a surface of the article.

[14] A method of producing a resin composite by melt-compounding a methacrylic resin (A) that contains no less than 80% by mass of a structural unit derived from methyl methacrylate and that has a melt viscosity η(A) of 1,500 to 3,500 Pa·s at 220° C. and at a shear rate of 122/sec; and a block copolymer (B) in which a methacrylic acid ester polymer block (b2) is coupled to an acrylic acid ester polymer block (b1) and the block copolymer (B) has a melt viscosity η(B) of 75 to 1,500 Pa·s at 220° C. and at a shear rate of 122/sec, the method including:

blending 0.1 to 3 parts by mass of a hydroxy phenyl triazine-based UV absorber with 100 parts by mass of the total of the methacrylic resin (A) and the block copolymer (B);

setting a ratio η(A)/η(B) of the melt viscosity 11 (A) to the melt viscosity η(B) from 1 to 20; and performing the melt-compounding at a shear rate of 10 to 1,000/sec and at a temperature of from 180 to 300° C.

[15] The method of producing the resin composite according to [14], in which 65 to 99 parts by mass of the methacrylic resin (A) and 1 to 35 parts by mass of the block copolymer (B) are blended with 100 parts by mass of the total of the methacrylic resin (A) and the block copolymer (B), and the block copolymer (B) contains 30 to 60% by mass of the acrylic acid ester polymer block (b1) and 40 to 70% by mass of the methacrylic acid ester polymer block (b2).

Advantageous Effects of Invention

The present invention has an advantageous effect that a resin composite that excels in weatherability and transparency and that experiences less bleed out and whitening at a high temperature, a method of producing such the resin composite, a molded product, a film, and an article are provided.

DESCRIPTION OF EMBODIMENTS

Hereinafter, an example of embodiments to which the present invention is applied will be described. It is to be noted that the numerical values specified in the present specification are the values obtained when the measurements are carried out through the methods illustrated in the examples that will be described later. In addition, the numerical values "A to B" specified in the present specification indicate a range of values that satisfy the numerical value A and a value greater than the numerical value A and the numerical value B and a value smaller than the numerical value B. In addition, a "film" according to the present invention is not limited by the thickness or the like and includes a "sheet" defined by JIS.

The resin composite according to the present invention includes: a methacrylic resin (A) that contains no less than 80% by mass of a structural unit derived from methyl methacrylate and that has a melt viscosity η(A) of 1,500 to 3,500 Pa·s at 220° C. and at a shear rate of 122/sec; and a block copolymer (B) in which a methacrylic acid ester polymer block (b2) is coupled to an acrylic acid ester polymer block (b1), and the block copolymer (B) has a melt viscosity η(B) of 75 to 1,500 Pa·s at 220° C. and at a shear rate of 122/sec.

From the viewpoint of weatherability and transparency, the total of the methacrylic resin (A) and the block copolymer (B) per 100 parts by mass of the resin composite according to the present invention is preferably no less than 90% by mass, is more preferably no less than 95% by mass, and is even more preferably no less than 97% by mass.

As for the content of each of the methacrylic resin (A) and the block copolymer (B), when the content of the methacrylic resin (A) with respect to the total of 100 parts by mass of the methacrylic resin (A) and the block copolymer (B) is in a range from 65 to 99 parts by mass, the content of the block copolymer (B) is preferably in a range from 1 to 35 parts by mass; when the content of the methacrylic resin (A) is in a range from 75 to 92 parts by mass, the content of the block copolymer (B) is more preferably in a range from 8 to 25 parts by mass; and when the content of the methacrylic resin (A) is in a range from 79 to 88 parts by mass, the content of the block copolymer (B) is even more preferably in a range from 12 to 21 parts by mass, from the viewpoint of surface hardness and impact resistance.

The proportion of the structural unit derived from methyl methacrylate in the methacrylic resin (A) is no less than 80% by mass, is preferably no less than 90% by mass, is even more preferably no less than 95% by mass, is still more preferably no less than 99% by mass, and is particularly preferably 100% by mass. That is, the proportion of the structural unit derived from monomers other than methyl methacrylate is no greater than 20% by mass, is preferably no greater than 10% by mass, is even more preferably no greater than 5% by mass, is still more preferably no greater than 1% by mass, and is particularly preferably 0% by mass.

Examples of the monomers other than methyl methacrylate include acrylic acid esters such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, 2-ethylhexyl acrylate, pentadecyl acrylate, dodecyl acrylate, phenyl acrylate, benzyl acrylate, phenoxyethyl acrylate, 2-hydroxyethyl acrylate, 2-ethoxyethyl acrylate, glycidyl acrylate, allyl acrylate, cyclohexyl acrylate, norbornyl acrylate, and isobornyl acrylate; methacrylic acid esters other than methyl methacrylate, such as ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, 2-ethylhexyl methacrylate, pentadecyl methacrylate, dodecyl methacrylate, phenyl methacrylate, benzyl methacrylate, phenoxyethyl methacrylate, 2-hydroxyethyl methacrylate, 2-methoxyethyl methacrylate, glycidyl methacrylate, allyl methacrylate, cyclohexyl methacrylate, norbornyl methacrylate, and isobornyl methacrylate; unsaturated carboxylic acids, such as acrylic acid, methacrylic acid, maleic anhydride, maleic acid, and itaconic acid; olefins, such as ethylene, propylene, 1-butene, isobutene, and 1-octene; conjugated dienes, such as butadiene, isoprene, and myrcene; aromatic vinyl compounds, such as styrene, α-methylstyrene, p-methylstyrene, and m-methylstyrene; conjugated dienes such as butadiene, isoprene, and myrcene; aromatic vinyl compounds, such as α-methylstyrene, p-methylstyrene, and m-methylstyrene; acrylamide, methacrylamide, acrylonitrile, methacrylonitrile, vinyl acetate, vinyl pyridine, vinyl ketone, vinyl chloride, vinylidene chloride, and vinylidene fluoride; and so on.

The tacticity of the methacrylic resin (A) is not particularly limited, and a methacrylic resin having a tacticity of being isotactic, heterotactic, or syndiotactic may be used, for example.

The melt viscosity of the methacrylic resin (A) at 220° C. and at a shear rate of 122/sec is in a range from 1,500 to 3,500 Pa·s, from the viewpoint of the impact resistance and toughness of a molded product or the resin film (R) obtained from the resin composite according to the present invention. The lower limit of the melt viscosity is preferably no lower than 2,000 Pa·s, is more preferably no lower than 2,300 Pa·s, and is even more preferably no lower than 2,600 Pa·s. In addition, the upper limit of the melt viscosity is preferably no higher than 3,300 Pa·s, is more preferably no higher than 3,100 Pa·s, and is even more preferably no higher than 3,000 Pa·s.

The method of producing the methacrylic resin (A) is not particularly limited, and the methacrylic resin (A) can be obtained by polymerizing one or more types of monomers that contain no less than 80% by mass of methyl methacrylate under a suitable condition.

A commercially available methacrylic resin may be used as the methacrylic resin (A). Examples of such commercially available methacrylic resins include "PARAPET H1000B" (MFR: 22 g/10 min (230° C., 37.3 N)), "PARAPET GF" (MFR: 15 g/10 min (230° C., 37.3 N)), "PARAPET EH" (MFR: 1.3 g/10 min (230° C., 37.3 N)), "PARAPET HRL" (MFR: 2.0 g/10 min (230° C., 37.3 N)), "PARAPET HRS" (MFR: 2.4 g/10 min (230° C., 37.3 N)) and "PARAPET G" (MFR: 8.0 g/10 min (230° C., 37.3 N)) [these are all trade names, manufactured by Kuraray, Co., Ltd.).

The block copolymer (B) is a block copolymer in which a methacrylic acid ester polymer block (b2) is coupled to an acrylic acid ester polymer block (b1).

There is no particular limitation on the coupled state of (b1) and (b2). For example, there are a di-block copolymer which is expressed by (b1)-(b2); a tri-block copolymer which is expressed by (b1)-(b2)-(b1) or (b2)-(b1)-(b2); a multi-block copolymer which is expressed by (b1)-((b2)-(b1))$_n$, (b1)-((b2)-(b1))$_n$-(b2), or (b2)-((b1)-(b2))$_n$; and a star-block copolymer which is expressed by ((b1)-(b2))$_n$-X or ((b2)-(b1))$_n$-X (X is a coupling residue). The di-block copolymer which is expressed by (b1)-(b2) or a tri-block copolymer which is expressed by (b2)-(b1)-(b2) or (b1)-(b2)-(b1) is preferred for use in terms of productivity. The tri-block copolymer which is expressed by (b2)-(b1)-(b2) is more preferred for use in terms of the flowability of the resin composite at the time of the melting, surface smoothness of the resin film (R) and the molding, and haze. In this case, two methacrylic acid ester polymer blocks (b2) coupled to the respective ends of the acrylic acid ester polymer block (b1) may independently be different from or identical to each other in terms of the type of the constituting monomer, the proportion of the structural unit derived from a methacrylic acid ester, the weight-average molecular weight, and the tacticity. In addition, the block copolymer (B) may contain other polymer blocks.

When the block copolymer (B) is the triblock copolymer expressed by (b2)-(b1)-(b2), the mass percentages of the two methacrylic acid ester polymer blocks (b2), which are coupled to the respective ends of the acrylic acid ester polymer block (b1), in the block copolymer (B) preferably differ from each other, from the viewpoint of the flowability of the resin composite during melting, the surface smoothness of the resin film (R) and the molding, and the haze.

When the mass percentages of the methacrylic acid ester polymer blocks (b2) differ from each other and when the block with a higher mass percentage is defined as (b2(H)) and the block with a lower mass percentage is defined as (b2(L)), the ratio of the mass percentage of (b2(H)) to the mass percentage of (b2(L)) is preferably no lower than 1.3, is more preferably no lower than 1.5, and is even more preferably no lower than 1.8, from the viewpoint of the flowability of the resin composite during melting, the surface smoothness of the resin film (R) and the molded product, and the haze. The upper limit of the ratio is preferably no higher than 4, and is more preferably no higher than 3.

A primary constitutional unit of the acrylic acid ester polymer block (b1) constituting the block copolymer (B) is a structural unit derived from an acrylic acid ester. The proportion of the structural unit derived from an acrylic acid ester in the acrylic acid ester polymer block (b1) is preferably no lower than 50% by mass, is more preferably no lower than 70% by mass, is even more preferably no lower than 90% by mass, and is particularly preferably 100% by mass.

Examples of such acrylic acid esters include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. The acrylic acid ester polymer block (b1) can be formed by polymerizing one type alone of the above acrylic acid esters or a combination of two or more types of the above acrylic acid esters. In particular, one obtained by polymerizing n-butyl acrylate alone is preferable from the viewpoint of the economy, the impact resistance, and so on.

The acrylic acid ester polymer block (b1) may include a structural unit derived from a monomer other than an acrylic acid ester. The proportion of the structural unit is preferably no higher than 60% by mass, is more preferably no higher than 50% by mass, is even more preferably no higher than 30% by mass, is particularly preferably no higher than 10% by mass, and is most preferably 0% by mass.

Examples of such monomers other than an acrylic acid ester include a methacrylic acid ester, an unsaturated carboxylic acid, an aromatic vinyl compound, olefin, conjugated diene, acrylonitrile, methacrylonitrile, acrylamide, methacrylamide, vinyl acetate, vinyl pyridine, vinyl ketone, vinyl chloride, vinylidene chloride, and vinylidene fluoride. The acrylic acid ester polymer block (b1) can be formed by copolymerizing one type alone of the monomers other than an acrylic acid ester, or two or more types thereof with the acrylic acid ester described above.

A primary constitutional unit of the methacrylic acid ester polymer block (b2) is a structural unit derived from a methacrylic acid ester. The proportion of the structural unit derived from a methacrylic acid ester in the methacrylic acid ester polymer block (b2) is preferably no lower than 80% by mass, is more preferably no lower than 90% by mass, is even more preferably no lower than 95% by mass, and is particularly preferably 100% by mass.

Examples of the methacrylic acid ester include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate. Among the above, from the viewpoint of improving the transparency and the heat resisting properties, methacrylic acid alkyl esters such as methyl methacrylate, ethyl methacrylate, isopropyl methacrylate, n-butyl methacrylate, tert-butyl methacrylate, cyclohexyl methacrylate, and isobornyl methacrylate are preferable, and methyl methacrylate is more preferable. The methacrylic acid ester polymer block (b2) can be formed by polymerizing one type alone of the above methacrylic acid esters or a combination of two or more types of the above methacrylic acid esters.

The methacrylic acid ester polymer block (b2) may include a structural unit derived from a monomer other than a methacrylic acid ester. The proportion of the structural unit is preferably no higher than 20% by mass, is more preferably no higher than 10% by mass, is even more preferably no higher than 5% by mass, and is particularly preferably 0% by mass.

Examples of such monomers other than a methacrylic acid ester include an acrylic acid ester, an unsaturated carboxylic acid, an aromatic vinyl compound, olefin, conjugated diene, acrylonitrile, methacrylonitrile, acrylamide, methacrylamide, vinyl acetate, vinyl pyridine, vinyl ketone, vinyl chloride, vinylidene chloride, and vinylidene fluoride. The methacrylic acid ester polymer block (b2) can be formed by copolymerizing one type alone of the above monomers other than a methacrylic acid ester or a combination of two or more types of the above monomers with the methacrylic acid ester described above.

The proportion of the methacrylic acid ester polymer block (b2) in the block copolymer (B) is preferably no lower than 40% by mass, is more preferably no lower than 43% by mass, and is even more preferably no lower than 47% by mass with respect to the total of 100% by mass of the acrylic acid ester polymer block (b1) and the methacrylic acid ester polymer block (b2), from the viewpoint of transparency, surface hardness, moldability, surface smoothness, and impact resistance. In addition, the stated proportion is preferably no higher than 70% by mass, is more preferably no higher than 65% by mass, and is even more preferably no higher than 60% by mass.

The tacticity of the methacrylic acid ester polymer block (b2) is preferably such that the triad syndiotacticity (rr) is no lower than 60%, is more preferably no lower than 65%, is even more preferably no lower than 70%, and is particularly preferably no lower than 75%, from the viewpoint of increasing the glass transition temperature.

The melt viscosity of the block copolymer (B) at 220° C. and at a shear rate of 122/sec is in a range from 75 to 1,500 Pa·s. The lower limit of the melt viscosity is preferably no lower than 150 Pa·s and is more preferably no lower than 300 Pa·s. The upper limit of the melt viscosity is preferably no higher than 1,000 Pa·s, is more preferably no higher than 700 Pa·s, and is even more preferably no higher than 500 Pa·s. By setting the melt viscosity to a range from 75 to 1,500 Pa·s, the resin film (R) and the molded product obtained from the resin composite according to the present invention excels in impact resistance and surface smoothness, and the number of fish eyes can be reduced.

The block copolymer (B) may include a functional group, such as a hydroxyl group, a carboxyl group, an acid anhydride, or an amino group, in a molecular chain or at an end of the molecular chain.

The method of producing the block copolymer (B) is not particularly limited, and a method based on well-known methods can be employed. For example, a method in which the monomer constituting each polymer block is subjected to living polymerization is typically used. Examples of techniques for such living polymerization include a method in which the monomer is subjected to anionic polymerization under the presence of a mineral acid salt, such as an alkali metal or an alkaline-earth metal salt, with an organic alkali metal compound being used as a polymerization initiator; a method in which the monomer is subjected to anionic polymerization under the presence of an organic aluminum compound with an organic alkali metal compound being used as a polymerization initiator; a method in which the monomer is polymerized with an organic rare-earth metal complex being used as a polymerization initiator; and a method in which the monomer is subjected to radical polymerization under the presence of a copper compound with an α-halogenated ester compound being used as an initiator. In addition, there is also a method in which the monomer constituting each block is polymerized with a polyvalent radical polymerization initiator or a polyvalent radical chain transfer agent being used and a mixture containing the block copolymer (B) is produced. Among the above methods, a method in which the monomer is subjected to anionic polymerization under the presence of an organic aluminum compound with an organic alkali metal compound being used as a polymerization initiator is preferable since a high-purity block copolymer (B) can be obtained, since the molecular weight or the composition ratio can be controlled with ease, and since the method is economical.

The resin composite according to the present invention contains 0.1 to 3 parts by mass of a hydroxyphenyl triazine-based UV absorber in 100 parts by mass of the total of the methacrylic resin (A) and the block copolymer (B). When the UV absorber is less than 0.1 parts by mass, the weatherability is low. Meanwhile, when the UV absorber is more than 3 parts by mass, transparency tends to deteriorate by the increase of the yellowness and the resin composite tends to bleed out. The lower limit of the content is preferably 0.2 parts by mass or more, is more preferably 0.3 parts by mass or more, is even more preferably 0.4 parts by mass or more, particularly preferably 0.5 parts by mass or more, is most preferably 0.7 parts by mass or more. The upper limit of the content is preferably 2.5 parts by mass or less, is more preferably 1.7 parts by mass or less, is even more preferably 1.5 parts by mass or less, and is particularly preferably 1.3 parts by mass or less.

The hydroxyphenyl triazine UV absorber is preferably a compound having an ultraviolet absorbing ability and having a hydroxyphenyl triazine skeleton of the following general formula (1), and is more preferably a compound having a hydroxyphenyl triazine skeleton of the following general formula (2).

[General formula (1)]

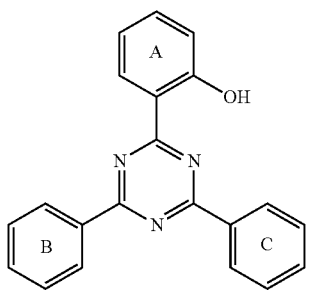

(1)

Note that A, B and C are benzene rings which may have a substituent.

[General formula (2)]

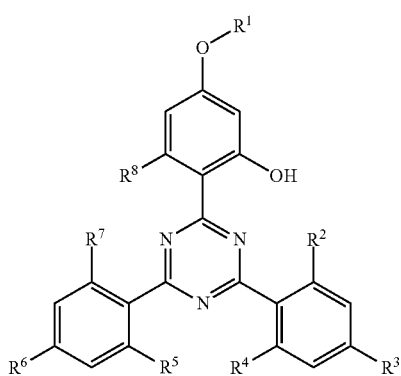

(2)

Note that $R^1$ to $R^8$ are each independently selected from hydrogen, an alkyl group such as a methyl group, an ethyl group, a propyl group, a butyl group, a methoxy group, an ethoxy group, a propynyl group, a butoxy group, an alkoxy group, and a phenyl group. These substituents may have other functional groups or atoms therein, for example, alkoxy groups having a structure such as —O—$Z_1$—COO—$Z_2$. Note that $Z_1$ and $Z_2$ are each independently an alkyl group.

Preferred examples of the hydroxyphenyl triazine-based UV absorber include 2,4-bis(2-hydroxy-4-butoxyphenyl)-6-(2,4-dibutoxyphenyl)-1,3,5-triazine (Trade name Tinuvin 460, manufactured by BASF), 2-[2-hydroxy-4-[3-(2-ethylhexyl-1-oxy)-2-hydroxypropyloxy]phenyl]-4,6-bis(2,4-dibutoxyphenyl)-1,3,5-triazine (Trade name Tinuvin 405, manufactured by BASF), 2-[2-hydroxy-4-(1-octyloxycarbonylethoxy)phenyl]-4,6-bis(4-phenyl)-1,3,5-triazine (trade name: Tinuvin 479, manufactured by BASF), Tinuvin 1577, 400, 477, 1600 (all trade names) manufactured by BASF, etc. Also, 2-(4,6-diphenyl-1,3,5-triazin-2-yl)-5-[2-(2-ethylhexanoyloxy)ethoxy]phenol (product name: Adekastab LA-46, manufactured by ADEKA CORPORATION), 2,4,6-tris(2-hydroxy-4-hexyloxy-3-methylphenyl)-1,3,5-triazine (product name: Adekastab LA-F70, manufactured by ADEKA CORPORATION), 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, and the like. Among these, from the viewpoint of weatherability, a hydroxyphenyl triazine type UV absorber having an ester group is preferable, and, for example, 2-[2-hydroxy-4-(1-octyloxycarbonylethoxy)phenyl]-4,6-bis(4-phenyl)-1,3,5-triazine (product name: Tinuvin 479, manufactured by BASF) is preferable.

From the viewpoints of thermal stability, volatility, bleed out, compatibility, and dispersibility, the molecular weight of the hydroxyphenyl triazine-based UV absorber is preferably 500 or more. Moreover, from the viewpoint of availability, it is preferably less than 1,000, and more preferably less than 700.

By combining the hydroxyphenyl triazine-based UV absorber with the methacrylic resin (A) and the block copolymer (B) having both the specific structure, the specific content ratio, and the melt viscosity ratio of the present invention, and setting the content of the hydroxyphenyl triazine-based UV absorber to 0.1 to 3 parts by mass, the resin composite can exhibit excellent ultraviolet absorbing ability, weatherability, and transparency. Furthermore, the resin composite can prevent bleeding out and whitening even under a high temperature (for example, 100° C. or more) environment and protect the base.

The resin composite of the present invention may contain other UV absorbers other than the hydroxyphenyl triazine UV absorber. Examples of other UV absorbers include benzophenones, benzotriazoles, triazines, benzoate acid esters, salicylic acid esters, cyanoacrylic esters, oxalic anilides, malonic esters, formamidines, etc. These can be used singly or in combination of two or more types thereof.

The resin composite of the present invention preferably contains a processing aid in the range of 0.1 to 3.0 parts by mass with respect to 100 parts by mass of the resin composite, is more preferably 0.5 to 2.5 parts by mass, and is even more preferably 1 to 2 parts by mass. When the amount of the processing aid is less than 0.1 parts by mass, the film thickness stability at an edge portion of the resin film (R) decreases, and as a result, the yield of the film tends to decrease. Furthermore, the fish eye of the resin film (R) tends to increase. On the other hand, when the amount of the processing aid exceeds 3.0 parts by mass, the transparency of the resin film (R) tends to decrease.

As the processing aid, from the viewpoint of the compatibility with the resin composite and the film thickness stability of the resin film (R), a methacrylic resin (P) that is composed of no less than 60% by mass of a methyl methacrylate unit and no greater than 40% by mass of a vinyl-based monomer unit that can be copolymerized with the methyl methacrylate unit is preferable, and the methacrylic resin (P) that is composed of 70 to 90% by mass of a methyl methacrylate unit and 10 to 30% by mass of a vinyl-based monomer unit that can be copolymerized with the methyl methacrylate unit is more preferable. Examples of the vinyl-based monomers that can be copolymerized with methyl methacrylate include methacrylic acid esters, such as ethyl methacrylate, n-butyl methacrylate, and cyclohexyl methacrylate; acrylic acid esters, such as ethyl acrylate, methyl acrylate, n-butyl acrylate, and cyclohexyl acrylate; aromatic vinyl compounds, such as styrene, p-methylstyrene, and o-methylstyrene; maleimide-based compounds, such as N-propyl maleimide, N-cyclohexyl maleimide, and N-o-chlorophenyl maleimide; and polyfunctional monomers, such as ethylene glycol dimethacrylate, propylene glycol dimethacrylate, triethylene glycol dimethacrylate, hexanediol dimethacrylate, ethylene glycol diacrylate, propylene glycol diacrylate, triethylene glycol diacrylate, allyl methacrylate, and triallyl isocyanurate. In particular, butyl acrylate is preferable from the viewpoint of the economy, the compatibility with the resin composite according to the present invention, the transparency of the resin composite, and the haze. In addition, the mean degree of polymerization of such processing aids is preferably in a range from 3,000 to 40,000, is more preferably in a range from 15,000 to 30,000, and is even more preferably in a range from 20,000 to 25,000 from the viewpoint of the compatibility with the resin composite, the transparency of the resin composite, and the haze.

The limiting viscosity of the processing aid is preferably from 3 to 6 dl/g. The film thickness stability at an edge portion of the resin film (R) is reduced when the limiting viscosity is smaller than 3, and the die line of the resin composite tends to increase when the limiting viscosity is greater than 6.

The polymerization method for producing the processing aid is not particularly limited, but the processing aid is preferably produced by emulsion polymerization. Examples of emulsifying agents that can be used in emulsion polymerization include dialkyl sulfosuccinates, such as sodium dioctyl sulfosuccinate, which is an anionic emulsifying agent, and sodium dilauryl sulfosuccinate; alkyl benzenesulfonates, such as sodium dodecylbenzenesulfonate; alkyl sulfates, such as sodium dodecyl sulfate; polyoxyethylene alkyl ether sulfates, such as polyoxyethylene alkyl ether, which is a nonionic emulsifying agent, polyoxyethylene nonylphenyl ether sulfate, and sodium polyoxyethylene alkyl ether sulfate; and alkyl ether carboxylates, such as sodium polyoxyethylene tridecyl ether acetate.

When the pH of the processing aid is greater than 7 by use of the emulsifying agent, an appropriate pH regulator can be used to prevent hydrolysis of methyl methacrylate. Examples of the pH regulators to be used include boric acid-potassium chloride-potassium hydroxide, potassium dihydrogen phosphate-sodium hydrogen phosphate, boric acid-potassium chloride-potassium carbonate, citric acid-potassium hydrogen citrate, potassium dihydrogen phosphate-boric acid, and sodium dihydrogen hydrogen phosphate-citric acid.

Examples of the polymerization initiator to be used for producing the processing aid include a sole system of a water-soluble initiator or an oil-soluble initiator, or a redox system. An inorganic initiator, such as persulfate, can be used alone as an example of the water-soluble initiator, or the inorganic initiator can be combined with sulfite, bisulfite, thiosulfate, or the like.

A representative product of the processing aid is, for example, the Kane ACE PA series manufactured by Kaneka Corporation, Metablen P series manufactured by Mitsubishi Rayon Co., Ltd., and Paraloid K series manufactured by Dow Chemical Company (all trade names). Among them, in terms of the film thickness stability at the edge portion of the resin film (R), yield of the film, and fish eye reduction, Metablen P530A, Metablen P550, and Paraloid K125P (all trade names) are preferable, and Metablen P 530 A is more preferable.

Various additives may be added to the resin composite according to the present invention, and examples of the additives include an antioxidant, a thermostabilizer, a lubricant, an antistatic agent, a colorant, an impact resistance aid, a foaming agent, a filler, a delustering agent, a light diffusing agent, a softening agent, and a plasticizer. It is preferable that a foaming agent, a filler, a delustering agent, a light diffusing agent, a softening agent, or a plasticizer be not added in a large amount from the viewpoint of the impact resistance and the surface hardness of the resin film (R) and the molded product including the resin composite according to the present invention. When a colorant is added to the resin composite according to the present invention, the transparency, which the present invention addressed, may be not obtained. However, as long as the transparency is ensured in the resin composite in which a colorant component is not added, the standard for the "transparency" according to the present invention is satisfied. For example, a yellow-colored film may be subjected to metal vapor deposition, while the standard for "transparency" according to the present invention is satisfied, and the film thus obtained may be used as a golden film.

The resin composite according to the present invention can be mixed with another polymer other than the methacrylic resin (A) and the block copolymer (B). Examples of such other polymers include polyolefin resins, such as polyethylene, polypropylene, polybutene-1, poly-4-methylpentane-1, and polynorbornene; ethylene-based ionomers; styrene-based resins, such as polystyrene, a styrene-maleic anhydride copolymer, high impact polystyrene, an styrene acrylonitrile (AS) resin, an acrylonitrile butadiene styrene (ABS) resin, an acrylonitrile ethylene styrene (AES) resin, an acrylonitrile acrylic rubber styrene (AAS) resin, an acrylonitrile-chlorinated polyethylene-styrene (ACS) resin, and a methyl methacrylate-butadiene-styrene (MBS) resin; methyl methacrylate-styrene copolymers; polyester resins, such as polyethylene terephthalate (PET) and polybutylene terephthalate (PBT); polyamides, such as nylon 6, nylon 66, and polyamide elastomer; polycarbonate, polyvinyl chloride, polyvinylidene chloride, polyvinyl alcohol, ethylene-vinyl alcohol copolymer, polyacetal, polyvinylidene fluoride, polyurethane, modified polyphenylene ether, polyphenylene sulfide, and a silicone modified resin; acrylic rubber and silicone rubber; styrene-based thermoplastic elastomers, such as styrene ethylene-propylene styrene block copolymer (SEPS), styrene-ethylene-butene-styrene block copolymer (SEBS), and styrene-isoprene-styrene block copolymer (SIS); and olefin-base rubber, such as isoprene rubber (IR), ethylene propylene rubber (EPR), and ethylene-propylene-diene rubber (EPDM).

The method of preparing the resin composite according to the present invention is not particularly limited, but a melt-compounding method is preferably employed in order to increase the dispersiveness of each component constituting the resin composite. In the method of melt-compounding the methacrylic resin (A) and the block copolymer (B), they may be mixed with a hydroxy phenyl triazine-based UV absorber and another additive, as necessary, or the methacrylic resin (A) may be mixed with a hydroxy phenyl triazine-based UV absorber and another additive, and the block copolymer (B) may then be mixed thereinto. The compounding operation can be carried out with the use of a known mixing or compounding device, such as a kneader-ruder, an extruder, a mixing roll, or a Bunbury mixer, for example. In particular, it is preferable to use a twin screw extruder from the viewpoint of improving the dispersiveness and the compatibility of the methacrylic resin (A) and the block copolymer (B). It is preferable that the shear rate at the time of melt-compounding be from 10 to 1,000/sec. The temperature at the time of mixing may be adjusted as appropriate in accordance with the melting temperature or the like of the methacrylic resin (A), the block copolymer (B), and so on to be used, is preferably in the range from 110 to 300° C., is more preferably in the range from 180 to 290° C., and is even more preferably 230 to 270° C. When the melt-compounding is carried out with the use of a twin screw extruder, it is preferable to use a vent and to carry out the melt-compounding under a reduced pressure or under a nitrogen stream from the viewpoint of suppressing coloring and deterioration of the resin composite. In this manner, the resin composite according to the present invention can be obtained in a desired form, such as a pellet or powder. The resin composite in the form of a pellet, powder, or the like is suitable for use as a molding material.

In addition, it is also possible to prepare the resin composite according to the present invention by dissolving the block copolymer (B) in a mixed solution of a methacryl-based monomer, which is a monomer unit of the methacrylic resin (A), and a solvent such as toluene and by polymerizing the methacryl-based monomer.

A molded product according to the present invention includes a molding formed of the resin composite according to the present invention. A melt-extrusion molding method, such as a T-die method, a calendar method, an inflation method, or a contour extrusion method, and an injection molding method or the like can be applied to produce the molded product according to the present invention. The molded product according to the present invention may be a molding consisting only of the resin composite according to the present invention or may be a molded product in which a molding composed of the resin composite according to the present invention and a molded product composed of another resin composite are integrated through, for example, bonding or the like.

A film according to the present invention includes at least a resin film (R) formed of the resin composite according to the present invention. In other words, the film according to the present invention may be a film consisting only of the resin film (R) or may be a film in which another layer is laminated on the resin film (R).

The resin film (R) formed of the resin composite according to the present invention can be produced through a well-known method, such as a T-die method, an inflation method, a melt-casting method, and a calendar method. From the viewpoint of obtaining a resin film (R) having high surface smoothness and low haze, a method that includes a step of extruding the melt-compounded product of the resin composite according to the present invention from a T-die in a melted state and shaping by bringing the melt-compounded product into contact with a surface of a mirror finish roll or a surface of a mirror finish belt is preferable. A method that includes a step of shaping the extruded melt-compounded product by bringing both surfaces thereof into contact with a mirror finish surface is more preferable. The mirror finish roll or the mirror finish belt to be used in this case is preferably made of metal. In a case in which both surfaces of the extruded melt-compounded product are brought into contact with a mirror finish surface in this manner for production, it is preferable that the resin film (R) be pressured and pinched by the mirror finish roll or the mirror finish belt. It is more preferable that the resin film be pressed and pinched by an elastic mirror finish roll and a metal elastic roll. The lower limit, as a linear pressure, of the pinching pressure of the mirror finish roll or the mirror finish belt is preferably no lower than 3 N/mm, is more preferably no lower than 5 N/mm, and is even more preferably no lower than 7 N/mm. In addition, the upper limit is preferably no higher than 50 N/mm, is more preferably no higher than 30 N/mm, and is even more preferably no higher than 15 N/mm. The surface smoothness tends to decrease when the linear pressure is lower than 3 N/mm, and the film tends to be distorted when the linear pressure is higher than 50 N/mm.

In the case of producing the resin film (R) by the T-die method, an extruder-type melt-extruding device or the like provided with single or twin extruding screws can be used. The melt-extrusion temperature for producing the resin film (R) is preferably no lower than 200° C., is more preferably no lower than 220° C., and is even more preferably no lower than 240° C. In addition, the melt-extrusion temperature is preferably no higher than 300° C. and is more preferably no higher than 270° C. It is preferable to use a vent and to carry out the melt-extrusion under a reduced pressure or under a nitrogen stream from the viewpoint of suppressing coloring and deterioration of the resin composite.

In addition, from the viewpoint of surface smoothness, surface glossiness, and haze, the surface temperature of the mirror finish roll or the mirror finish belt that pinches the resin film (R) is preferably no lower than 60° C. and is more preferably no lower than 70° C. In addition, the temperature is preferably no higher than 130° C. and is more preferably no higher than 100° C.

The surface smoothness and the haze of the resin film (R) tend to deteriorate when the surface temperature of the mirror finish roll or the mirror finish belt that pinches the resin film (R) is lower than 60° C. The resin film (R) makes too tight contact with the mirror finish roll or the mirror finish belt when the surface temperature exceeds 130° C., and thus the surface of the resin film (R) is roughened easily when the resin film (R) is peeled off from the mirror finish roll or the mirror finish belt, which causes transverse wrinkles or the like and tends to degrade the appearance of the resin film (R).

The roughness of at least one surface of the resin film (R) is preferably no greater than 2.5 nm and is more preferably no greater than 1.5 nm. Thus, the film excels in surface smoothness and in handling when being cut or stamped, and the film excels in surface glossiness when used for an application that requires a sophisticated design. When printing is performed on the film according to the present invention, the film excels in sharpness in a pattern layer or the like. In addition, in the optical applications, the film excels in such optical characteristics as the light ray transmittance and in the shaping accuracy when surface shaping is carried out.

In addition, the haze of the resin film (R) is preferably no greater than 0.7%, is more preferably no greater than 0.3%, and is even more preferably no greater than 0.2%. Thus, when the resin film (R) is used for an application that requires a sophisticated design, the resin film (R) provides superior surface glossiness and superior sharpness in the pattern layer printed on the film according to the present invention. In addition, in such optical applications as a liquid crystal protection film or a light guide film, the utilization efficiency of the light source increases, which is thus preferable. Furthermore, the film excels in the shaping accuracy when surface shaping is carried out, which is thus preferable.

In addition, it is preferable that the temperature dependence of haze of the resin film (R) be smaller. Thus, when the resin film is used for applications that require transparency in a broad temperature range or is used at a high temperature, for example, in lighting equipment, optical members, electronic and electric members, and automobile members, the resin film excels in transparency.

The thickness of the resin film (R) is preferably no more than 500 μm. When the thickness exceeds 500 μm, the laminatability and handling at the time of cutting, stamping, or the like decreases, and the cost per unit area increases, leading to an economic disadvantage, which is thus not preferable. The thickness of the resin film (R) is more preferably no more than 300 μm and is even more preferably no more than 200 μm. Further, the thickness of the resin film (R) is preferably no less than 10 μm and is more preferably no less than 40 μm.

The resin film (R) may have been subjected to an orientation process. The mechanical strength increases through the orientation process, and the resin film (R) that is less susceptible to cracking can be obtained. The orientation method is not particularly limited, and a simultaneous biaxial orientation method, a sequential biaxial orientation method, a tubular orientation method, a rolling method, or the like can be used. With regard to the temperature at the time of orientation, from the viewpoint of achieving uniform orientation and obtaining the resin film (R) with high strength, the lower limit is the temperature that is higher than the glass transition temperature of the methacrylic resin by 5° C., and the upper limit is the temperature that is higher than the glass transition temperature of the methacrylic resin by 40° C. When the orientation temperature is too low, the resin film (R) tends to break more easily during orientation. When the orientation temperature is too high, the effect of the orientation process is not exhibited sufficiently, and the strength of the resin film (R) is less likely to increase. The orientation is typically carried out at 100%/min to 5,000%/min. When the orientation rate is low, the strength is less likely to increase, and the productivity decreases. Meanwhile, when the orientation rate is high, the molded product may break, which makes uniform orientation difficult. After the orientation, it is preferable to carry out heat sealing. Through the heat sealing, a film with less heat contraction can be obtained. The thickness of the film obtained through the orientation is preferably from 10 to 200 μm.

The resin film (R) may be colored. The coloring method can be a method in which the resin composite of the methacrylic resin (A) and the block copolymer (B) is made to contain a pigment or a dye; a method in which the resin film (R) is immersed in a liquid in which a dye is dispersed; and so on, but the coloring method is not particularly limited to the above.

The resin film (R) may have printing performed on at least one surface thereof. Designs such as patterns, characters, and graphics and colors are provided through printing. The designs may be chromatic or achromatic. It is preferable that the printing be performed on a side that is in contact with another thermoplastic resin or thermosetting resin in order to prevent fading of the printed layer.

The hardness of at least one surface of the resin film (R) is preferably HB or higher and is more preferably F or higher in terms of the pencil hardness measured in accordance with JIS-K5600-5-4. The resin film (R) having a surface that is at HB or harder is less likely to be scratched and is thus suitably used as a decorative and protective film on the surface of a molded product that requires a sophisticated design.

The film according to the present invention may be a film in which at least one of (i) a metal layer, (ii) a metal oxide layer, (iii) another thermoplastic resin layer; and (iv) a base material layer is laminated on at least one surface of the resin film (R). Examples of the thermoplastic resin forming the other thermoplastic resin layer include a polycarbonate resin, a polyethylene terephthalate resin, a polyamide resin, a polyethylene resin, a polypropylene resin, a polystyrene resin, a polyvinyl chloride resin, other (meth)acrylic resins, an acrylonitrile-butadiene-styrene resin, an ethylene vinyl alcohol resin, a polyvinyl butyral resin, a polyvinyl acetal resin, a styrene-based thermoplastic elastomer, an olefin-based thermoplastic elastomer, and an acryl-based thermoplastic elastomer. Examples of the base material layer include a wooden base material and non-wooden fiber such as kenaf. One or a plurality of such layers can be laminated.

The thickness of the film according to the present invention can vary depending on the applications and is thus not limited, but the thickness is preferably no greater than 500 μm from the viewpoint of secondary processability in vacuum forming, air-pressure forming, or the like.

The method of producing the laminated film is not particularly limited. For example, (1) a method in which the resin film (R) and another thermoplastic resin film are prepared separately and are laminated continuously between heat rolls, a method in which the resin film (R) and the other thermoplastic resin film are subjected to thermocompression bonding by a press, a method in which the resin film (R) and the other thermoplastic resin film are subjected to air-pressure forming or vacuum forming and are laminated at the same time, a method in which the resin film (R) and the other thermoplastic resin film are laminated together with a bonding layer interposed therebetween (wet lamination); (2) a method in which another thermoplastic resin that has been melt-extruded from a T-die is laminated on the resin film (R); (3) a method in which the resin composite that includes the methacrylic resin (A) and the block copolymer (B) and the other thermoplastic resin are co-extruded; and so on can be used. Among the above methods, in the methods of (1) or (2), a bonding surface of the resin film (R) or the other thermoplastic resin film may be subjected to surface treatment such as corona treatment before being laminated.

In addition, when a metal layer and/or a metal oxide layer is provided in the film according to the present invention, examples of the metal that can be used include aluminum, silicon, magnesium, palladium, zinc, tin, nickel, silver, copper, gold, indium, stainless steel, chromium, and titanium, and examples of the metal oxide that can be used include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, and barium oxide. These metals and metal oxides may each be used alone or may be used as a mixture of two or more types thereof. Among the above, indium is preferable because it excels in design sophistication and is less susceptible to losing glossiness even when a metal layer is provided on the resin film (R) through vapor deposition or the like and a film on which another layer is laminated is subjected to deep-draw forming. In addition, aluminum is preferable when in particular a deep draw is not required because aluminum excels in design sophistication and is industrially available inexpensively. With regard to the method of providing a metal layer and/or a metal oxide layer, a vacuum vapor deposition method is typically used, but other methods such as ion plating, sputtering, and CVD (Chemical Vapor Deposition) may also be used. The thickness of the metal layer and/or the metal oxide layer is typically approximately from 5 to 100 nm. The thickness is preferably from 5 to 250 nm in a case in which deep-draw forming is carried out after the layer is formed.

In the film according to the present invention, the resin film (R) may be used alone, may be used as an inner layer or a part thereof, or may be used as an outermost layer. The number of films to be laminated is not particularly limited. Another resin to be used in lamination is preferably a transparent resin such as a methacrylic resin from the viewpoint of design sophistication of the film. From the viewpoint that the film is less prone to damage and the sophisticated design lasts longer, the outermost layer preferably has high surface hardness and high weatherability, and a film made of a methacrylic resin or the resin film (R) according to the present invention, for example, is preferable.

An article according to the present invention is an article in which the film according to the present invention is provided on a surface of the article made of another thermoplastic resin, a thermosetting resin, a wooden base material, or a non-wooden fiber base material, or the like.

Examples of the other thermoplastic resin to be used for the article include a polycarbonate resin, a polyethylene terephthalate resin, a polyamide resin, a polyethylene resin, a polypropylene resin, a polystyrene resin, a polyvinyl chloride resin, other (meth)acrylic resins, an acrylonitrile-butadiene-styrene copolymer resin, an ethylene vinyl alcohol resin, a polyvinyl butyral resin, a polyvinyl acetal resin, a styrene-based thermoplastic elastomer, an olefin-based thermoplastic elastomer, and an acryl-based thermoplastic elastomer. Examples of the other thermosetting resin include an epoxy resin, a phenolic resin, and a melamine resin. In addition, the article according to the present invention may be an article in which the film according to the present invention is provided on a surface of a wooden base material or a base material made of non-wooden fiber such as kenaf.

The method of producing the article according to the present invention is not particularly limited. For example, the film according to the present invention can be vacuum formed, air-pressure formed, or compression formed while being heated on the surface of another thermoplastic resin, a thermosetting resin, a wooden base material, or a non-wooden fiber base material, and thus the article according to the present invention can be obtained. In the article according to the present invention, the film according to the present invention is provided on an outermost layer of a base material or the like, and thus the article excels in surface smoothness, surface hardness, surface glossiness, and so on. In addition, when printing is performed on the film according to the present invention, the patterns and the like are displayed sharply. In addition, when the film according to the present invention in which a metal layer is laminated is used, specular glossiness comparable to that of a metal can be obtained.

A preferable method of producing the article according to the present invention is a method typically referred to as an injection molding simultaneous lamination method.

This injection molding simultaneous lamination method is a method in which the film according to the present invention is inserted between matching male and female molds for injection molding, a melted thermoplastic resin is injected into the molds from one surface of the film, an injection-molded product is formed, and simultaneously the film is laminated onto the molded product.

The film to be inserted into the molds may be flat or may be shaped into a corrugated shape through preforming, such as vacuum forming or air-pressure forming.

The preforming of the film may be carried out with a molding machine different from the injection molding machine, or the preforming may be carried out within the molds of the injection molding machine used in the injection molding simultaneous lamination method. The method of the latter, that is, the method in which a film is preformed and a melted resin is injected onto one side of the film is referred to as insertion molding. At this time, in the film according to the present invention, it is preferable that the film be disposed such that another layer laminated on the resin film (R) is on the resin side that is to be injection-molded, that is, the resin film (R) serves as the outermost surface. In this manner, an article on the outermost surface of which the film according to the present invention is provided can be obtained.

EXAMPLES

Hereinafter, the present invention will be described more specifically by illustrating examples and comparative examples. It is to be noted that the present invention is not limited by the following examples. In addition, the present invention encompasses all the aspects formed by combining, as desired, the matters expressing the technical features such as characteristic values, modes, production methods, and applications described thus far. The values of the physical properties in the examples and the comparative examples were measured through the following methods.

[Proportion of Each Constitutional Unit]

The proportion of each constitutional unit of the methacrylic resin (A) and the block copolymer (B) was calculated from the charged amount of each monomer.

[Melt Viscosity]

The melt viscosity of each of the methacrylic resin (A) and the block copolymer (B) at 220° C. and at a shear rate of 122/sec was measured under the following conditions. The methacrylic resin (A) and the block copolymer (B) were extruded from a capillary of Capirograph (type 1D, manufactured by Toyo Seiki Seisaku-Sho, Ltd.) having a diameter of 1 mm and a length of 10 mm at 220° C. at a piston speed of 10 mm/min, and the numerical value calculated from the shear stress generated under the above conditions was taken as the melt viscosity.

[Haze]

A resin film (R) manufactured under the conditions described in the examples was cut into a size of 50 mm×50 mm to prepare a test piece, and the haze of the test piece was measured in accordance with JIS-K 7136 at 23° C. by a haze meter (HM-150 manufactured by Murakami Color Research Laboratory Co., Ltd.).

[Yellowness]

The film produced under the conditions described in the examples was cut into a size of 50 mm×50 mm to prepare a test piece, and the yellowness of the test piece was measured at 23° C. in accordance with JIS-K 7373.

[Surface Hardness (Pencil Hardness)]

The resin film (R) produced under the production conditions described above was cut out to form a test piece of 10 cm×10 cm, and the pencil hardness of the test piece was measured in accordance with JIS K 5600-5-4.

[Surface Roughness (Surface Smoothness)]

The resin film (R) produced under the production conditions described above was cut out to form a test piece of 5 mm×5 mm. The shape of the surface was measured with the use of an atomic force microscope (SPI 4000 Probe Station E-sweep environmental control unit, manufactured by SII nanotechnology Inc.) including a probe (SI-DF20 (back side Al) manufactured by SII nanotechnology Inc.) in the DFM mode. Prior to the measurement of the sample, the surface roughness of a reference sample with a pitch of 10 μm and a step height of 100 nm was measured to confirm that the instrument had the measurement errors in the X-axis and the Y-axis of no more than 5% with respect to 10 μm and the measurement error in the Z-axis of no more than 5% with respect to 100 nm.

The observation region of the sample was 5 μm×5 μm, and the measurement frequency was 0.5 Hz. The number of scanning lines was 512 along the X-axis and 512 along the Y-axis. The measurement was carried out in the atmospheric environment at a temperature of 25° C.±2° C. and a humidity of 30%±5%. The obtained measurement data was analyzed by data processing software that accompanied the apparatus, and the mean surface roughness Ra was determined. Specifically, the [Tertiary inclination correction] command under the [Tool] menu of the measurement software for the apparatus was selected to correct the inclination of the film and the inclination of the whole surface arising due to large waves, and then the [Surface roughness analysis] command under the [Analysis] menu was selected to obtain the mean surface roughness Ra. The mean surface roughness Ra is a value obtained by averaging the absolute values of the deviations from the reference surface to the specified surface and is defined by the following formula.

$$Ra = \frac{1}{S_0} \int_X \int_Y |F(X,Y) - Z_0| dXdY \quad [\text{Math. 1}]$$

In the above, F(X,Y) represents the value of the height on the (X,Y) coordinates. $Z_0$ represents the mean value of the Z data defined as follows.

$$Z_0 = \frac{1}{S_0} \int_X \int_Y F(X,Y) dXdY \quad [\text{Math. 2}]$$

In addition, $S_0$ represents the area of the measurement region.

The mean surface roughness Ra was measured at ten different regions on both sides (referred to as the A side and the B side, for convenience) of the resin film (R), and a smaller one of the mean values of the mean surface roughness Ra at ten regions was taken as the surface roughness of the film.

The tertiary inclination correction was carried out by fitting the measured sample surface to a tertiary approximate surface estimated by the least-square method in order to eliminate the influence of the inclination and the waves of the film sample.

[Heating Whitening (Temperature Dependence of Haze)]

The resin film (R) produced under the production conditions described in the examples was cut out to form a test piece of 50 mm×50 mm, the haze (prior to heating) thereof was measured in accordance with JIS K 7136, and the test piece was then left in an oven at a temperature of 80° C. for ten minutes. The test piece was taken out of the oven, and immediately the haze (after heating) of the test piece was measured in the same manner as described above and evaluated by the following evaluation criteria. It is to be noted that the change in the haze as used herein is expressed by the following formula.

change in haze=haze(after heating)−haze(prior to heating)

E (Excellent): The change in the haze is no greater than 0.1% but no greater than 0.5%.

G (Good): The change in the haze is greater than 0.5%.

P (Poor): The change in the haze is greater than 0.5%.

[Bleed Out]

A test piece was cut out from the resin film (R) manufactured under the conditions described in the examples to a size of 50 mm×50 mm, and the test piece was left for 500 hours in an oven at 100° C. Then, the test piece was picked up from the oven and its surface condition was observed and judged according to the following evaluation criteria.

E (Excellent): There is no bleed out and the surface condition is good.

P (Poor): There is bleed out and whiteness

[Weatherability]

The resin film (R) produced under the conditions described in the examples was cut into a size of 50 mm×50 mm to prepare a test piece, the test piece and an injection molded sheet of 3 mm in thickness made of acrylic resin (HR 1000 manufactured by Kuraray Co., Ltd.) were overlapped, and their end portions were fixed with a tape to obtain a laminated board. Using the SM color computer (M-4 manufactured by Suga Tester Co., Ltd.), the values of L, a, b in the Lab color space on the surface of the laminate on the test piece side were measured, respectively.

Then, ultraviolet rays were irradiated on the surface of the test piece side of the laminating board under conditions of a black panel temperature of 83° C., a relative humidity of 50%, and an irradiation energy of 100 mW/cm² for 300 hours using a super ultraviolet test apparatus (SUV-W 161 manufactured by Iwasaki Electric Co., Ltd.). Then, the laminated board was taken out from testing equipment, and the values of L, a, b were measured by the above-mentioned method in the surface of the test piece side of the laminated board, respectively. The difference (ΔL, Δa, Δb) between the values of L, a, b before and after the ultraviolet ray irradiation was obtained, and the color difference (ΔE) was obtained using the following equation.

$$\Delta E = [(\Delta L)^2 + (\Delta a)^2 + (\Delta b)^2]^{1/2}$$

[Impact Resistance]

The resin film (R) produced under the conditions described in the examples was affixed to a steel plate with an air gap in such a manner that the air gap of the steel plate is covered, and an iron ball with a weight of 20 g was allowed to free fall onto the resin film (R) in the air gap portion. The height from which the iron ball was allowed to free fall was changed by 10 cm, and the impact strength was calculated by the maximum height from which the iron ball could be dropped without breaking the film.

[Fish Eye]

The resin film (R) of 300 m roll manufactured under the conditions described in the examples was passed through an on-line defect inspector (Scantec8000C1 System3 manufactured by NAGASE & CO., LTD.), the number of fish eyes having a size of 0.03 mm$^2$ or more was measured, and the number of fish eyes per 1 m$^2$ was calculated.

[Manufacture of Articles]

An aluminum vapor deposition side of a laminated film (the resin film (R)+aluminum vapor deposition layer) prepared under the conditions described in the examples and an ABS resin sheet having a thickness of 300 μm (NSG400, manufactured by Techno Polymer Co., Ltd.) are subjected to dry laminate through an adhesive (RU004, manufactured by Rock Paint Corporation), and a laminate including the layer constitution of the resin film (R)/the aluminum vapor deposition layer/adhesive/ABS resin sheet was produced. Then, the article was obtained by performing vacuum pressure forming on the laminate at 130° C.

[Mirror Glossiness of Laminated Film]

The resin film (R) produced under the conditions described in the examples was cut into a size of 20 cm×30 cm, one side of the resin film was subjected to a corona discharge treatment, and then aluminum was vapor-deposited by a vacuum evaporation method to obtain a laminated film. The thickness of the aluminum layer was 30 nm. The specular glossiness of the non-deposited surface of this laminated film was visually evaluated.

E (Excellent): There is specular gloss.
G (Good): There is somewhat specular gloss.
P (Poor): No specular gloss.

In the reference examples illustrated hereinafter, the used compounds were those dried and purified according to a conventional method and degassed with nitrogen. In addition, the transfer and the supply of the compound were carried out under a nitrogen atmosphere.

Reference Example 1 [Synthesis of Methacrylic Resin (A-1)]

0.1 parts by mass of a polymerization initiator (2,2'-azobis (2-methylpropionitrile), hydrogen withdrawing ability: 1%, 1 hour half-life temperature: 83° C.) and 0.21 parts by mass of a chain transfer agent (n-octylmercaptan) were added to and dissolved in a monomer consisting of 100 parts by mass of methyl methacrylate to obtain a raw material liquid.

100 parts by mass of ion exchanged water, 0.03 parts by mass of sodium sulfate, and 0.45 parts by mass of a suspension dispersant were mixed together to obtain a mixed solution. 420 parts by mass of the mixed solution and 210 parts by mass of the raw material liquid were charged in a pressure resistant polymerization tank, and a polymerization reaction was started while stirring under a nitrogen atmosphere at a temperature of 70° C. When three hours have passed from the start of the polymerization reaction, the temperature was raised to 90° C. and stirring was continued for one more hour to obtain a copolymer dispersion.

The obtained copolymer dispersion was washed with an appropriate amount of ion exchanged water, the bead-like copolymer was taken out by a bucket-type centrifugal separator and dried for 12 hours with a hot air drier at 80° C. to obtain a bead-like methacrylic resin (A-1).

The obtained methacrylic resin (A-1) had a methyl methacrylate content of 100% by mass and a melt viscosity of 3,000 Pa·s at 220° C. and at a shear rate of 122/sec.

Reference Example 2 [Synthesis of Methacrylic Resin (A-2)]

0.1 parts by mass of a polymerization initiator (2,2'-azobis (2-methylpropionitrile), hydrogen withdrawing ability: 1%, 1 hour half-life temperature: 83° C.) and 0.24 parts by mass of a chain transfer agent (n-octylmercaptan) were added to and dissolved in a monomer consisting of 99.3 parts by mass of methyl methacrylate and 0.7 parts by mass of methyl acrylate to obtain a raw material liquid.

100 parts by mass of ion exchanged water, 0.03 parts by mass of sodium sulfate, and 0.45 parts by mass of a suspension dispersant were mixed together to obtain a mixed solution. 420 parts by mass of the mixed solution and 210 parts by mass of the raw material liquid were charged in a pressure resistant polymerization tank, and a polymerization reaction was started while stirring under a nitrogen atmosphere at a temperature of 70° C. When three hours has passed from the start of the polymerization reaction, the temperature was raised to 90° C. and stirring was continued for one more hour to obtain a copolymer dispersion.

The obtained copolymer dispersion was washed with an appropriate amount of ion exchanged water, the bead-like copolymer was taken out by a bucket-type centrifugal separator and dried for 12 hours with a hot air drier at 80° C. to obtain a bead-like methacrylic resin (A-2).

The obtained methacrylic resin (A-2) had a methyl methacrylate content of 99.3% by mass and a melt viscosity of 2,780 Pa·s at 220° C. and at a shear rate of 122/sec.

Reference Example 3 [Synthesis of Block Copolymer (B-1)]

In a degassed reaction chamber of 1 m$^3$, 400 kg of dried toluene, 20 kg of 1,2-dimethoxyethane, 40 kg of toluene solution containing 20 mol of isobutylbis(2,6-di-tert-butyl-4-methylphenoxy) aluminum as a catalyst, and 1.5 kg of cyclohexane solution containing 2 mol of sec-butyllithium as a polymerization initiator were added, and 20 kg of methyl methacrylate were added dropwise to polymerize a methacrylic acid ester polymer block (b2-1). After that, 67 kg of n-butyl acrylate were added dropwise to polymerize an acrylic acid ester polymer block (b1), and 47 kg of methyl methacrylate were further added dropwise to polymerize a methacrylic acid ester polymer block (b2-2), and lastly the polymerization was stopped with methanol to obtain a block copolymer (B-1). The obtained block copolymer (B-1) had a tri-block structure of (b2-1)-(b1)-(b2-2), and the composition ratio of (b2-1)-(b1)-(b2-2) was 15% by mass-50% by mass-35% by mass. In addition, the melt viscosity of the block copolymer (B-1) at 220° C. and at a shear rate of 122/sec was 377 Pa·s.

Reference Example 4 [Synthesis of Block Copolymer (B-2)]

In a degassed reaction chamber of 1 m$^3$, 400 kg of dried toluene, 20 kg of 1,2-dimethoxyethane, 40 kg of toluene solution containing 20 mol of isobutylbis(2,6-di-tert-butyl-4-methylphenoxy) aluminum, and 1.5 kg of cyclohexane solution containing 2 mol of sec-butyllithium as a polymerization initiator were added, and 60 kg of methyl methacrylate were added dropwise to polymerize the methacrylic acid ester polymer block (b2). After that, 60 kg of n-butyl acrylate were added dropwise to polymerize an acrylic acid ester polymer block (b1), and lastly the polymerization was stopped with methanol to obtain the block copolymer (B-2). The obtained block copolymer (B-2) had a diblock structure of (b2)-(b1), and the composition ratio of (b2)-(b1) was 50% by mass-50% by mass. In addition, the melt viscosity of the block copolymer (B-2) at 220° C. and at a shear rate of 122/sec was 350 Pa·s.

Reference Example 5 [Synthesis of Block Copolymer (B-3)]

In a degassed reaction chamber of 1 m$^3$, 400 kg of dried toluene, 20 kg of 1,2-dimethoxyethane, 40 kg of toluene solution containing 20 mol of isobutylbis(2,6-di-tert-butyl-4-methylphenoxy) aluminum, and 0.8 kg of cyclohexane solution containing 1 mol of sec-butyllithium as a polymerization initiator were added, and 45 kg of methyl methacrylate were added dropwise to polymerize the methacrylic acid ester polymer block (b2). After that, 45 kg of a monomer mixture of n-butyl acrylate/benzyl acrylate=50/50 (mass percentage) were added dropwise to polymerize the acrylic acid ester polymer block (b1), and lastly the polymerization was stopped with methanol to obtain a block copolymer (B-3). The obtained block copolymer (B-3) had a diblock structure of (b2)-(b1), and the composition ratio of (b2)-(b1) was 50% by mass-50% by mass. In addition, the melt viscosity of the block copolymer (B-3) at 220° C. and at a shear rate of 122/sec was 160 Pa·s.

Reference Example 6 [Synthesis of Block Copolymer (B-4)]

In a degassed reaction chamber of 1 m$^3$, 400 kg of dried toluene, 20 kg of 1,2-dimethoxyethane, 40 kg of toluene solution containing 20 mol of isobutylbis(2,6-di-tert-butyl-4-methylphenoxy) aluminum, and 1.5 kg of cyclohexane solution containing 2 mol of sec-butyllithium as a polymerization initiator were added, and 20 kg of methyl methacrylate were added dropwise to polymerize the methacrylic acid ester polymer block (b2-1). After that, 78 kg of n-butyl acrylate were added dropwise to polymerize the acrylic acid ester polymer block (b1), and 20 kg of methyl methacrylate were further added dropwise to polymerize the methacrylic acid ester polymer block (b2-2), and lastly the polymerization was stopped with methanol to obtain a block copolymer (B-4). The obtained block copolymer (B-4) had a tri-block structure of (b2-1)-(b1)-(b2-2), and the composition ratio of (b2-1)-(b1)-(b2-2) was 17% by mass-66% by mass-17% by mass. In addition, the melt viscosity of the block copolymer (B-4) at 220° C. and at a shear rate of 122/sec was 210 Pa·s.

Reference Example 7 [Synthesis of Core-Shell Rubber (C)]

In a reactor provided with an agitator, a temperature gauge, a nitrogen gas inlet tube, a monomer inlet tube, and a reflux condenser, 1,050 parts by mass of ion exchanged water, 0.3 parts by mass of sodium polyoxyethylene tridecyl ether acetate, and 0.7 parts by mass of sodium carbonate were charged and a sufficient amount of air in the reactor was replaced with a nitrogen gas. Then, the temperature in the reactor was set to 80° C. In the reactor, 0.25 parts by mass of potassium persulfate were introduced and stirred for five minutes. Further, 245 parts by mass of a monomer mixture of 95.4% by mass of methyl methacrylate, 4.4% by mass of methyl acrylate, and 0.2% by mass of allyl methacrylate were continuously added dropwise for 60 minutes. After the addition dropwise was finished, a polymerization reaction was further carried out for 30 minutes.

Next, in the reactor, 0.32 parts by mass of potassium persulfate were added dropwise and stirred for five minutes. After that, 315 parts by mass of a monomer mixture of 80.5% by mass of butyl acrylate, 17.5% by mass of styrene, and 2% by mass of allyl methacrylate were continuously added dropwise for 60 minutes. After the addition dropwise was finished, a polymerization reaction was further carried out for 30 minutes.

Next, in the reactor, 0.14 parts by mass of potassium persulfate were added dropwise and stirred for five minutes. After that, 140 parts by mass of a monomer mixture of 95.2% by mass of methyl methacrylate, 4.4% by mass of methyl acrylate, and 0.4% by mass of n-n-octile mercaptan were continuously added dropwise for 30 minutes. After the addition dropwise was finished, the polymerization reaction was further carried out for 60 minutes. By the operation described above, a latex containing the obtained core-shell rubber (C) was frozen and solidified and then washed with water and dried to obtain the core-shell rubber (C).

Example 1

85 parts by mass of the methacrylic resin (A-1), 15 parts by mass of the block copolymer (B-1), and 1 part by mass of a hydroxy phenyl triazine-based UV absorber (TINUVIN 479 manufactured by BASF) were melt-compounded by a twin screw extruder having a diameter of 41 mm at an extrusion temperature of 250° C. and at an extrusion rate of 100 kg/h, extruded in a strand shape, and cut by a pelletizer to produce a pellet of a resin composite.

The obtained resin composite was melt in a vent-type single screw extruder having a diameter of 65 mm, extruded from a die having a width of 900 mm at an extrusion temperature of 250° C. and an extrusion rate of 40 kg/h, pinched between a metal elastic roll having a surface temperature of 80° C. and a metal rigid roll having a surface temperature of 80° C. at a linear pressure of 9 N/mm, and drawn at 10 m/min. Thus, the film having a thickness of 75 μm was produced. The surface roughness, haze, pencil hardness, heating temperature whitening, bleed out, weatherability, impact resistance, and fish eye of the obtained film were measured and evaluated. In addition, a laminated film was created by depositing aluminum on the obtained film through the vacuum vapor deposition method, and the specular glossiness was evaluated. These results are shown in Table 1.

Examples 2 to 7

A film was obtained in the same method as in Example 1, except that the composition illustrated in Table 1 was changed in Example 1, and the physical properties were evaluated in the same method. The result is shown in Table 1.

Comparative Examples 1 and 2 and Reference Example 1

A film was obtained in the same method as in Example 1, except that the composition illustrated in Table 1 was changed in Example 1, and the physical properties were evaluated in the same method. The result is shown in Table 1.

TABLE 1

| | Example 1 | Example 2 | Example 3 | Example 4 | Example 5 | Example 6 | Example 7 | Comparative Example 1 | Comparative Example 2 | Reference Example 1 |
|---|---|---|---|---|---|---|---|---|---|---|
| resin composite methacrylic resin (A) [parts by mass] | | | | | | | | | | |
| methacrylic resin (A-1) ($\eta$: 3000 Pa·s) | 85 | 80 | 85 | 80 | | | 60 | 85 | 80 | |
| methacrylic resin (A-2) ($\eta$: 2780 Pa·s) | | | | | 80 | 80 | | | | 80 |
| block copolymer (B) [parts by mass] | | | | | | | | | | |
| block copolymer (B-1) ($\eta$: 377 Pa·s) | 15 | 20 | 15 | | | | 40 | 15 | | |
| block copolymer (B-2) ($\eta$: 350 Pa·s) | | | | 20 | | | | | 20 | |
| block copolymer (B-3) ($\eta$: 160 Pa·s) | | | | | 20 | | | | | |
| block copolymer (B-4) ($\eta$: 210 Pa·s) | | | | | | 20 | | | | |
| core-shell rubber (C) [parts by mass] | | | | | | | | | | 20 |
| $\eta A/\eta B$ | 8.0 | 8.0 | 8.0 | 8.6 | 17.3 | 13.2 | 8.0 | 8.0 | 8.6 | |
| processing aid [parts by mass] | | | | | | | | | | |
| processing aid A (PARALOID K125P) | | | | | 1.5 | | | | | 1.5 |
| processing aid B (METABLEN P530A) | | | 1.5 | 1.5 | | | 1.5 | | 1.5 | |
| ultraviolet absorber [parts by mass] | | | | | | | | | | |
| ultraviolet absorber A (ADK STAB LA-31RG) | | | | | | | | 1.0 | 2.0 | 1.0 |
| ultraviolet absorber B (TINUVIN 460) | | 1.0 | | | | | | | | |
| ultraviolet absorber C (TINUVIN 479) | 1.0 | | 1.0 | 1.0 | 1.0 | 1.0 | 1.0 | | | |
| properties of film | | | | | | | | | | |
| surface roughness [nm] | 1.3 | 1.3 | 1.3 | 1.1 | 1.3 | 0.8 | 1.8 | 1.4 | 1.2 | 1.7 |
| haze [%] | 0.2 | 0.3 | 0.1 | 0.1 | 0.4 | 9.8 | 0.3 | 0.1 | 0.4 | 1.2 |
| yellowness | 0.7 | 0.8 | 0.7 | 0.9 | 0.8 | 1.0 | 0.9 | 0.7 | 1.8 | 2 |
| surface hardness (pencil hardness) | HB | HB | HB | F | HB | HB | 6B | HB | HB | H |
| heating temperature whitening | E | E | E | E | E | E | E | E | E | P |
| bleed out | E | E | E | E | E | E | E | P | P | E |
| weatherability | 1 | 7 | 1 | 3 | 2 | 2 | 3 | 12 | 9 | 5 |
| impact resistance [mJ] | 50 | 60 | 50 | 40 | 10 | 50 | 70 | 50 | 40 | 300 |
| fish eye [number/m$^2$] | 0.30 | 0.38 | 0.09 | 0.12 | 0.15 | 0.42 | 0.10 | 0.35 | 0.11 | 0.16 |
| mirror glossiness of laminated film | E | E | E | E | E | E | E | E | E | G |

On the basis of these results, it can be seen that the resin composite according to the present invention excels in weatherability and transparency, effectively suppresses bleed out and whitening at a high temperature, and excels in heat resisting properties. In addition, the film and the molded product that are formed of the resin composite according to the present invention excel in surface hardness, surface smoothness, and the like. Also in the article created using the film according to the present invention including a metal layer, a high specular glossiness was obtained.

This application claims priority to Japanese Patent Application No. 2015-076714, filed on Apr. 3, 2015, the disclosure of which is incorporated herein in its entirety by reference.

INDUSTRIAL APPLICABILITY

According to the present invention, it is possible to provide a resin composite which has weatherability and transparency, excels in surface hardness, surface smoothness, and the like, and experiences less bleed out and whitening at a high temperature, by using a resin composite that satisfies a specific ratio between the above-described specific methacrylic resin (A) and block copolymer (B) and satisfies a specific melt viscosity ratio and by further using a specific amount of a hydroxy phenyl triazine-based UV absorber. By taking advantage of these advantageous features, the present invention can be suitably used for products requiring a sophisticated design or optical applications. Further, since the present invention excels in weatherability and heat resisting properties, the present invention can be suitably used for outdoor applications such as signboard components and automobile parts. Specifically, the molded product, the film, or the article according to the present invention is suitably used for signboard components including an advertising pillar, a stand signboard, a side signboard, a transom signboard, and a rooftop signboard; display components including a showcase, a divider panel, and a store display; illumination components including a fluorescent lamp cover, a mood lighting cover, a lamp shade, a luminous ceiling, a luminous wall, and a chandelier; interior design components including furniture, a pendant, and a mirror; construction components including a door, a dome, safety window glass, a partition, a staircase wainscot, a balcony wainscot, and a roof of a leisure building; transportation-related components including an airplane windshield, a pilot visor, a windshield for a motorcycle or a motorboat, a sun visor for a bus, a side visor for an automobile, a rear visor for an automobile, a head wing for an automobile, a headlight cover for an automobile, an automobile interior member, and an automobile exterior member such as a bumper; electronics components including a nameplate for an audio-visual system, a stereo cover, a protective mask for a television set, a vending machine, a cellular phone, and a personal computer; medical device-related components including an incubator and an X-ray part; device-related components including a machine cover, an instrument cover, an experimental device, a ruler, a dial, and an observation window; traffic-related components including a road sign, a direction board, a convex traffic mirror, and a highway noise barrier; a greenhouse, a large-sized tank, a box water tank, a bathroom member, a clock panel, a bath tub, a sanitary, a desk mat, a gaming machine component, a toy, a musical instrument, a decorative and protective film for the surface of a face protection mask when welding or the like, and a wallpaper; a marking film; optical films or optics-related components including a liquid crystal protective film, a polarizer protective film, a light guide film, a Fresnel's lens, a lenticular lens, front films of various displays, a diffusion film, a glass scattering prevention film; and so on.

The invention claimed is:

1. A resin composite, comprising:
   a methacrylic resin (A) that comprises no less than 80% by mass of a structural unit derived from methyl methacrylate;
   a block copolymer (B) in which a methacrylic acid ester polymer block (b2) is coupled to an acrylic acid ester polymer block (b1); and
   0.1 to 3 parts by mass of a hydroxyphenyl triazine-based UV absorber with respect to 100 parts by mass of a total of the methacrylic resin (A) and the block copolymer (B),
   wherein
   the methacrylic resin (A) has a melt viscosity $\eta(A)$ of 1,500 to 3,500 Pa·s at 220° C. and at a shear rate of 122/sec;
   the block copolymer (B) has a melt viscosity $\eta(B)$ of 75 to 1,500 Pa·s at 220° C. and at a shear rate of 122/sec, and
   a ratio $\eta(A)/\eta(B)$ of the melt viscosity $\eta(A)$ to the melt viscosity $\eta(B)$ is from 1 to 20.

2. The resin composite according to claim 1, wherein a molecular weight of the hydroxyphenyl triazine-based UV absorber is 500 g/mol or more.

3. The resin composite according to claim 1, comprising:
   65 to 99 parts by mass of the methacrylic resin (A) and 1 to 35 parts by mass of the block copolymer (B),
   per 100 parts by mass of the total of the methacrylic resin (A) and the block copolymer (B), wherein
   the block copolymer (B) comprises 30 to 60% by mass of the acrylic acid ester polymer block (b1) and 40 to 70% by mass of the methacrylic acid ester polymer block (b2).

4. The resin composite according to claim 1, further comprising:
   0.3 to 3 parts by mass of a processing aid with respect to 100 parts by mass of the resin composite,
   wherein the processing aid comprises no less than 60% by mass of a methyl methacrylate unit and no greater than 40% by mass of a vinyl-based monomer unit that is optionally copolymerized with methyl methacrylate, and
   the processing aid has a mean degree of polymerization of 3,000 to 40,000.

5. A molded product, comprising:
   a molding comprising the resin composite according to claim 1.

6. A film, comprising:
   a resin film (R) comprising the resin composite according to claim 1.

7. The film according to claim 6, wherein a surface roughness of at least one surface of the resin film (R) is no greater than 1.5 nm.

8. The film according to claim 6, wherein a haze of the resin film (R) is no greater than 0.7%.

9. The film according to claim 6, wherein the number of fish eyes having a size 0.03 $mm^2$ or more in the resin film (R) is 0.2/$m^2$ or less.

10. The film according to claim 6, wherein a pencil hardness of at least one surface of the resin film (R) is no lower than HB.

11. The film according to claim 6, wherein printing is performed on at least one surface of the resin film (R).

12. The film according to claim 6, wherein at least one selected from the group consisting of (i) a metal layer, (ii) a metal oxide layer, (iii) a thermoplastic resin layer, and (iv) a base material layer is laminated on at least one surface of the resin film (R).

13. An article, comprising:
    the film according to claim 6 provided on a surface of the article.

14. A method of producing a resin composite by melt-compounding a methacrylic resin (A) that contains no less than 80% by mass of a structural unit derived from methyl methacrylate and that has a melt viscosity $\eta(A)$ of 1,500 to 3,500 Pa·s at 220° C. and at a shear rate of 122/sec; and a block copolymer (B) in which a methacrylic acid ester polymer block (b2) is coupled to an acrylic acid ester polymer block (b1) and the block copolymer (B) has a melt viscosity $\eta(B)$ of 75 to 1,500 Pa·s at 220° C. and at a shear rate of 122/sec, the method comprising:
    blending 0.1 to 3 parts by mass of a hydroxy phenyl triazine-based UV absorber with 100 parts by mass of the total of the methacrylic resin (A) and the block copolymer (B);
    setting a ratio $\eta(A)/\eta(B)$ of the melt viscosity $\eta(A)$ to the melt viscosity $\eta(B)$ from 1 to 20; and
    performing the melt-compounding at a shear rate of 10 to 1,000/sec and at a temperature of from 180 to 300° C.

15. The method of producing the resin composite according to claim 14, wherein
    blending amounts of the methacrylic resin (A) and the block copolymer (B) for 100 parts by mass of the total of the methacrylic resin (A) and the block copolymer (B) are 65 to 99 parts by mass and 1 to 35 parts by mass, respectively, and
    the block copolymer (B) contains 30 to 60% by mass of the acrylic acid ester polymer block (b1) and 40 to 70% by mass of the methacrylic acid ester polymer block (b2).

* * * * *